(12) United States Patent
Bort

(10) Patent No.: US 7,383,303 B1
(45) Date of Patent: Jun. 3, 2008

(54) SYSTEM AND METHOD FOR INTEGRATING PERSONAL INFORMATION MANAGEMENT AND MESSAGING APPLICATIONS

(75) Inventor: David Bort, Palo Alto, CA (US)

(73) Assignee: Danger, Inc., Palo Alto, CA (US)

( * ) Notice: Subject to any disclaimer, the term of this patent is extended or adjusted under 35 U.S.C. 154(b) by 643 days.

(21) Appl. No.: 10/262,298

(22) Filed: Sep. 30, 2002

(51) Int. Cl.
*G06F 15/16* (2006.01)

(52) U.S. Cl. .................. 709/206; 709/203; 709/219; 709/223; 379/88.01; 379/201.01

(58) Field of Classification Search ........ 709/206–207, 709/203, 217, 219; 707/10, 102; 379/88.01, 379/88.23, 201.01
See application file for complete search history.

(56) References Cited

U.S. PATENT DOCUMENTS

| | | | |
|---|---|---|---|
| 5,159,592 A | 10/1992 | Perkins | |
| 5,546,447 A | 8/1996 | Skarbo et al. | |
| 5,559,800 A | 9/1996 | Mousseau et al. | |
| 5,579,472 A | 11/1996 | Keyworth et al. | |
| 5,594,910 A | 1/1997 | Filepp et al. | |
| 5,715,387 A | 2/1998 | Barnstijin et al. | |
| 5,727,159 A | 3/1998 | Kikinis | |
| 5,727,202 A | 3/1998 | Kucala | |
| 5,778,176 A | 7/1998 | Geihs et al. | |
| 5,790,974 A | 8/1998 | Tognazzini | |
| 5,802,312 A | 9/1998 | Lazaridis et al. | |
| 5,862,325 A | 1/1999 | Reed et al. | |
| 5,915,095 A | 6/1999 | Miskowiec | |
| 5,961,590 A | 10/1999 | Mendez et al. | |
| 5,964,830 A | 10/1999 | Durrett | |
| 6,023,708 A | 2/2000 | Mendez et al. | |
| 6,035,339 A | 3/2000 | Agraharam et al. | |

(Continued)

FOREIGN PATENT DOCUMENTS

WO    WO 98/36344    8/1998

(Continued)

OTHER PUBLICATIONS

Kelly D. Burger et al., "System and Method for Dynamical Managing Presence and Contact Information," U.S. Appl. No. 10/611,019, filed on Jun. 30, 2003, Office Action mailed Sep. 11, 2006. Copy of the Office Action, claims as they stood in the application prior to the mailing of the Office Action and a copy of the claims as they were presented to the PTO in response to the Office Action.

(Continued)

*Primary Examiner*—LaShonda Jacobs
(74) *Attorney, Agent, or Firm*—Blakely, Sokoloff, Taylor & Zafman, LLP

(57) ABSTRACT

A computer-implemented method is described comprising: identifying a set of contacts and/or contact groups permitted to contact a user of a data processing device during a scheduled event in an electronic calendar; receiving a communication event from a first contact over a first communication channel; comparing the first contact against the identified set of contacts and/or contact groups permitted to contact the user; and notifying the user of the communication event during the scheduled event only if the first contact is in the set of contacts and/or contact groups.

24 Claims, 5 Drawing Sheets

U.S. PATENT DOCUMENTS

| | | | |
|---|---|---|---|
| 6,047,053 A * | 4/2000 | Miner et al. | 379/201.01 |
| 6,057,841 A * | 5/2000 | Thurlow et al. | 715/809 |
| 6,076,093 A | 6/2000 | Pickering | |
| 6,076,109 A | 6/2000 | Kikinis | |
| 6,134,566 A | 10/2000 | Berman et al. | |
| 6,151,677 A | 11/2000 | Walter et al. | |
| 6,157,935 A | 12/2000 | Tran et al. | |
| 6,166,734 A | 12/2000 | Nahi et al. | |
| 6,167,441 A | 12/2000 | Himmel | |
| 6,199,099 B1 | 3/2001 | Gershman et al. | |
| 6,266,400 B1 | 7/2001 | Castagna | |
| 6,282,435 B1 | 8/2001 | Wagner | |
| 6,286,063 B1 | 9/2001 | Bolleman et al. | |
| 6,330,618 B1 | 12/2001 | Hawkins et al. | |
| 6,336,137 B1 | 1/2002 | Lee et al. | |
| 6,370,687 B1 | 4/2002 | Shimura | |
| 6,396,482 B1 | 5/2002 | Griffin et al. | |
| 6,418,310 B1 | 7/2002 | Dent | |
| 6,438,601 B1 | 8/2002 | Hardy | |
| 6,526,274 B1 * | 2/2003 | Fickes et al. | 455/414.1 |
| 6,574,471 B1 * | 6/2003 | Rydbeck | 455/418 |
| 6,622,175 B1 | 9/2003 | Piller | |
| 6,636,888 B1 * | 10/2003 | Bookspan et al. | 709/203 |
| 6,640,230 B1 * | 10/2003 | Alexander et al. | 707/10 |
| 6,771,756 B1 * | 8/2004 | Chou et al. | 379/201.01 |
| 6,798,753 B1 * | 9/2004 | Doganata et al. | 370/260 |
| 6,807,423 B1 | 10/2004 | Armstrong | |
| 6,988,128 B1 * | 1/2006 | Alexander et al. | 709/206 |
| 7,200,638 B2 * | 4/2007 | Lake | 709/206 |
| 7,284,002 B2 * | 10/2007 | Doss et al. | 707/10 |
| 2002/0007545 A1 | 1/2002 | Tarpenning et al. | |
| 2002/0010757 A1 | 1/2002 | Granik et al. | |
| 2002/0075305 A1 | 6/2002 | Beaton et al. | |
| 2002/0078150 A1 | 6/2002 | Thompson et al. | |
| 2003/0013483 A1 | 1/2003 | Ausems et al. | |
| 2004/0198427 A1 * | 10/2004 | Kimbell et al. | 455/556.1 |
| 2004/0235520 A1 | 11/2004 | Cadiz et al. | |
| 2005/0114456 A1 * | 5/2005 | Mathew et al. | 709/206 |

FOREIGN PATENT DOCUMENTS

WO     WO 00/30003     5/2000

OTHER PUBLICATIONS

Kelly D. Burger et al., "System and Method for Dynamical Managing Presence and Contact Information," U.S. Appl. No. 10/611,019, filed on Jun. 30, 2003, Office Action mailed Apr. 28, 2006. Copy of the Office Action, Claims as they stood in the application prior to the mailing of the Office Action.

Kelly D. Burger, "Multi-Mode Communication Apparatus and Interface for Contacting a User," U.S. Appl. No. 10/611,027, filed on Jun. 30, 2003, Notice of Allowance mailed Apr. 27, 2006. Copy of the Notice of Allowance, claims as they stood in the application prior to the mailing of the Notice of Allowance and a copy of the claims as they were presented to the PTO in response to the Notice of Allowance.

Kelly D. Burger et al., "System and Method for Dynamical Managing Presence and Contact Information," U.S. Appl. No. 10/611,019, filed on Jun. 30, 2003, Notice of Allowance mailed Jul. 25, 2006. Copy of the Notice of Allowance, claims as they stood in the application prior to the mailing of the Notice of Allowance and a copy of the allowed claims as they were presented to the PTO in response to the Notice of Allowance.

Excite Home Page, http://www.excite.com/, 1 page Aug. 1, 2000.

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques For Video Browsing, Digital Library Research Group, College of Library and Information Services University of Maryland, pp. 118-125.

Appenzeller, et al.., "User-friendly Access Control For Public Network Ports", IEEE, pp. 699-707, Mar. 1999.

IBM Technical Disclosure Bulletin, "Multimedia Telephone Caller Recognition" vol. 34, No. 10A, Mar. 1992, pp. 315-316.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting To Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances" 1999 IEEE Global Telecommunications Conference, Globecom 1999. Seamless Interconnection For Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference On World Wide Web, May 11, 1999, pp. 1-14, XP002163485.

"CC/PP Attribute Vocabularies" W3W Jul. 21, 2000, XP002218349.

David Bort, "System and Method for Dynamically Managing Presence and Contact Information", U.S. Appl. No. 10/611,019, filed on Jun. 30, 2003, Office Action mailed Mar. 9, 2007. Copy of the Office Action and claims as they were presented to the PTO in response to the Office Action.

\* cited by examiner

Calendar Entry

Subject: Patent Disclosure
Start Time: 10:00 AM
End Time: 11:30 AM

☐ Notify Me
☐ Mark Private

Location: Conf Room B
Description: Meeting to discuss three new patentable inventions
Type: Teleconference
Priority: 2

Permitted Contacts:
☐ All
☐ None
☒ All Personal
☐ All Business
☒ Specific Individuals/Groups:
[Contacts] Dave Bort
Joe Britt
Company Officers Permitted Contact Channels:
☐ All
☐ E-Mail [Settings]
☒ Instant Messaging [Settings]
☐ Telephone [Settings]
☐ Specific Contact Channels Permitted for Specific Contacts:
[Channels] Dave Bort – E-mail
Joe Britt – All
Company Officers – All

*Fig. 3*

Default Settings – Vacation

☐ Notify Me
☒ Mark Private

Priority: 3

Permitted Contacts:

☐ All
☐ None
☒ All Personal
☐ All Business
☐ Specific Individuals/Groups:

Permitted Contact Channels:

☒ All
☐ E-Mail [Settings]
☐ Instant Messaging [Settings]
☐ Telephone [Settings]
☐ Specific Contact Types Permitted for Specific Individuals/Groups:

*Fig. 5*

SYSTEM AND METHOD FOR INTEGRATING PERSONAL INFORMATION MANAGEMENT AND MESSAGING APPLICATIONS

BACKGROUND

1. Field of the Invention

This invention relates generally to the field of data processing systems. More particularly, the invention relates to a system and method for integrating information maintained by personal information management and/or messaging applications.

2. Description of the Related Art

Personal information management ("PIM") applications and electronic messaging applications have become irreplaceable tools in today's business environment. Virtually all corporate employees rely on PIM/messaging software in one form or another. In addition, a growing number of individual personal computer ("PC") user and/or personal digital assistant ("PDA") users rely on PIM/messaging applications to send/receive e-mail and instant messages, organize personal information such as addresses, to-do lists and personal schedules.

Two well known PIM/messaging application suites are Microsoft Outlook® and Lotus Notes®. Each of these application suites includes an e-mail client for sending/receiving e-mail, an electronic calendar for scheduling appointments, an address book for managing contact information, and a to-do list for managing upcoming tasks.

However, one limitation found in prior systems is that little or no interaction is permitted between the different PIM/messaging applications. For example, although the user's calendar may indicate that the user is in an all-day meeting, the calendar application is not capable of communicating this information to the e-mail or instant messaging application. If this level of interaction were possible, the user could configure his/her e-mail or instant messaging client to generate an automatic response and/or to enter into a "silent" mode whenever the user's calendar indicates that the user is in a meeting (e.g., "I am currently in a meeting and will respond to your message when I return").

Accordingly, what is needed is an improved suite of PIM/messaging applications. What is also needed is a suite of PIM/messaging applications which interact together in a variety of useful ways.

SUMMARY

A computer-implemented method is described comprising: identifying a set of contacts and/or contact groups permitted to contact a user of a data processing device during a scheduled event in an electronic calendar; receiving a communication event from a first contact over a first communication channel; comparing the first contact against the identified set of contacts and/or contact groups permitted to contact the user; and notifying the user of the communication event during the scheduled event only if the first contact is in the set of contacts and/or contact groups.

BRIEF DESCRIPTION OF THE DRAWINGS

A better understanding of the present invention can be obtained from the following detailed description in conjunction with the following drawings, in which:

FIG. 3 illustrates user-configurable settings for a calendar entry according to one embodiment of the invention.

FIG. 5 illustrates default settings for a particular type of calendar entry according to one embodiment of the invention.

DETAILED DESCRIPTION OF PREFERRED EMBODIMENTS

Described below is a system and method for integrating personal information management and messaging applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
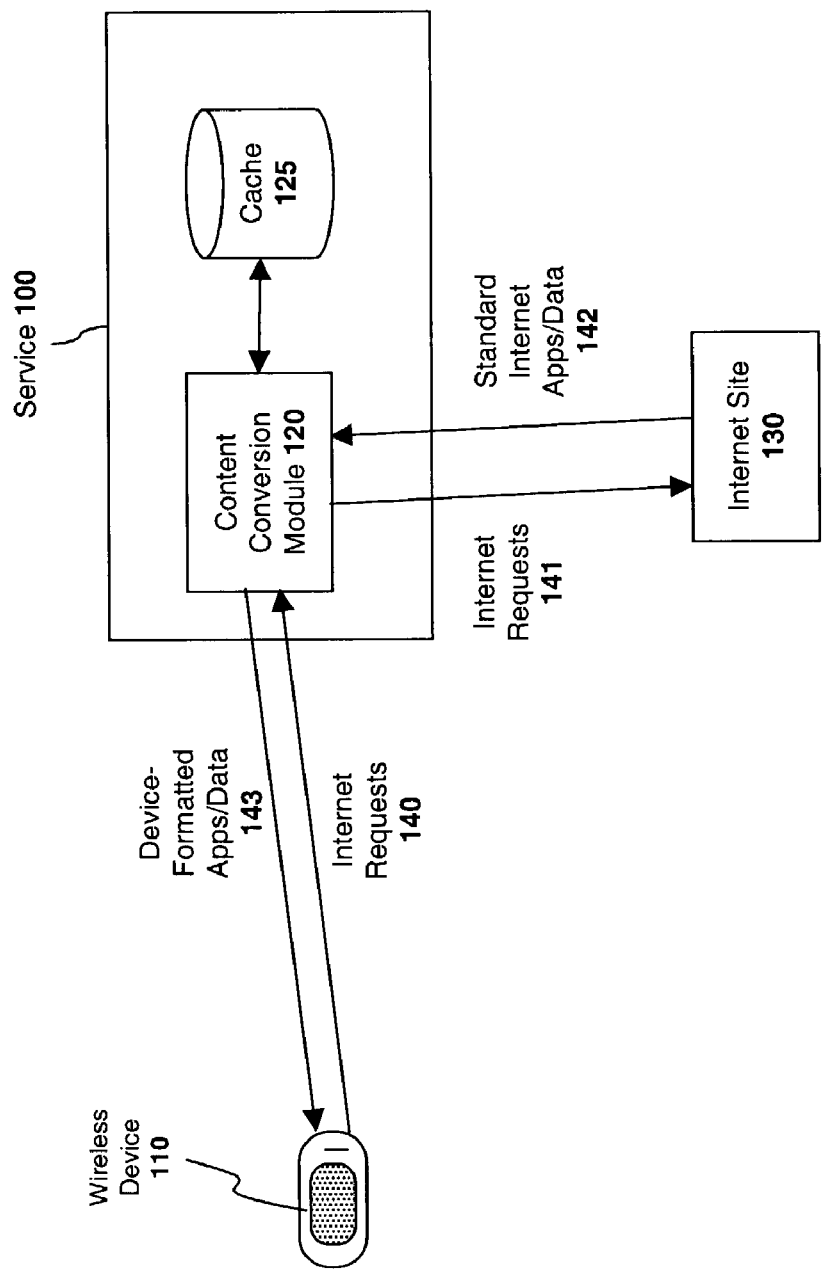
FIG. 1 illustrates a service communicating with a data processing device according to one embodiment of the invention.

Embodiments of the invention may be implemented on a wireless device 110 which communicates with a data processing service 100 as illustrated generally in FIG. 1. Embodiments of a service 100 and data processing device 110 are described in co-pending application entitled NETWORK PORTAL SYSTEM, APPARATUS AND METHOD, Ser. No. 09/714,897, filed Nov. 15, 2000 (hereinafter "Network Portal Application"), which is assigned to the assignee of the present application and which is incorporated herein by reference. Certain features of the service 100 will now be described followed by a detailed description of a system and method for integrating personal information management and messaging applications. As an initial matter, however, it should be noted that the specific architecture and system configuration described in the Network Portal Application is not required for implementing the underlying principles of the invention. Rather, the embodiments described below may be implemented on virtually any type of data processing device including standard personal computers, personal digital assistants and wireless telephones.

In one embodiment, the service 100 converts standard applications and data into a format which each wireless data processing device 110 can properly interpret. Thus, as illustrated in FIG. 1, one embodiment of the service 100 includes a content conversion module 120 for processing requests for Internet content 142. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 142 into a format 143 which the data processing device 110 can process (e.g., bytecodes as described in the Network Portal Application).

For example, the conversion module 120 may include a hypertext markup language ("HTML") rendering module (not shown) for interpreting HTML code and downloading any embedded content in the HTML code (e.g., graphics, video, sound, . . . etc) to the service 100. The conversion module 120 may then combine the HTML code and embedded content and generate a set of bytecodes for accurately reproducing the requested content on the data processing device 110. As described above, in one embodiment, the bytecodes may be Java bytecodes/applets. However, the conversion module 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion module 120 may perform pre-scaling and color depth adjustments to the requested content so that it will be rendered properly within the data processing device's 110's display. In making these calculations, the conversion may factor in the memory and processing power available on the data processing device 110. In addition, the conversion module 120 may compress the requested content using a variety of compression techniques, and thereby preserve network bandwidth.

In one embodiment, the conversion module 120 will simply discard Internet content which either cannot be reproduced on the data processing device 110, or which the user has indicated that he/she does not want to be reproduced on the portal device. For example, a user may indicate that he/she does not want sounds to be generated on the data processing device 110 or that he/she does not want advertisements transmitted to the data processing device 110. The conversion module 120 will then remove any sounds or advertisements embedded in the requested Web page (or other requested Internet content). Because HTML rendering and other advanced processing of Internet content/data is offloaded to the service 100 as described above, the data processing device 110 can be manufactured using a low power microprocessor or microcontroller, thereby lowering the cost of manufacture and/or the energy consumed by the device 110.

In one embodiment, when a particular Web page or other Internet object has been converted into a format suitable for execution on the data processing device 110 the formatted page/object may be stored locally on a cache 125 maintained at the service 100. The next time the content is requested, the conversion module 120 may simply read the previously-generated code from the local cache 125 (i.e., it will no longer need to retrieve the content from remote locations to reconstruct the code).

Various caching techniques and algorithms may be implemented to ensure that the cache 125 is storing Internet data efficiently (i.e., resulting in an acceptable percentage of cache 'hits') and that the data is current. For example, the service 100 may cache the most frequently-requested Internet data (e.g., the Yahoo™ home page), and may remove content from the cache based on a least-recently used caching policy. In addition, to ensure that data stored in the cache is current, the service 100 may compare the version of the data stored in the cache 125 with the version of data stored at the remote Internet site 130 when the data is requested. Similarly, the service 100 may store data in the cache 125 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routin0g Protocol ("CARP")).

Personal Information Management and Messaging Application Integration

Figure 2:
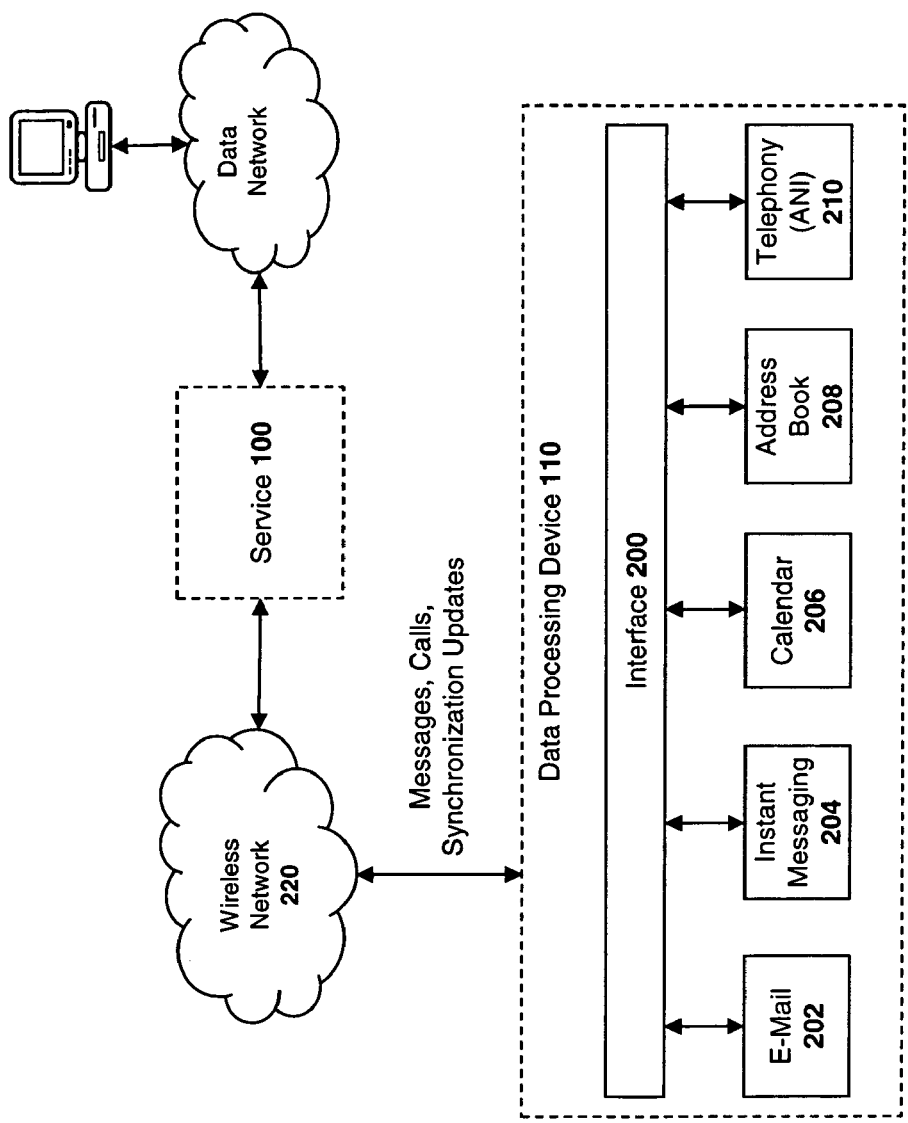
FIG. 2 illustrates one embodiment of a system for integrating personal information management and messaging applications.

As illustrated in FIG. 2, a plurality of PIM and messaging applications are executed on the data processing device 110 including, but not limited to, an e-mail client 202, an instant messaging client 204, an electronic calendar 206, an electronic address book 208 and a telephony module 210 for providing two-way audio communications via a wireless network 220. As indicated in FIG. 2, the telephony module 210 may also employ automatic number identification ("ANI") techniques for identifying incoming callers.

In one embodiment of the invention, the PIM and messaging applications 202-210 executed on the data processing device 110 interact with one another through an interface 200. The interface 200 is comprised of a set of functions which allow the PIM/messaging applications to interact with one another in the various ways set forth herein. Although the interface 200 is illustrated on the data processing device 110 in FIG. 2, certain functions performed by the interface 200 or, for that matter, the entire interface 200, may be executed on the service 100.

In one embodiment, the calendar application 206 controls the other applications executed on the data processing device 110 based on the user's schedule. For example, while the user is in a particular meeting, he/she may not want to be contacted via instant messages or telephone. As such, in one embodiment, through the interface 200, the calendar application 206 indicates to the telephony module 210 that during the designated meeting time (which is stored in the calendar application 206), all incoming calls are to be directed to the user's voicemail or to an alternate number. Similarly, the calendar application 206 may indicate to the instant messaging module 204 that all incoming instant messages are to be discarded or stored for later retrieval (i.e., either on the data processing device 110 or on the service 100). In addition, in one embodiment, the instant messaging module 204 may automatically transmit a response providing information regarding the user's status (e.g., "I am in a meeting from 10:00 until 11:30; I will respond to your message when the meeting has ended").

FIG. 3 illustrates a calendar entry window 300 comprised of various user-selectable parameters that define the manner in which other PIM/messaging applications will operate while the user is in a particular meeting. As with standard scheduling applications, the calendar entry window 300 includes data fields for a subject, start time and end time 302; a meeting location and meeting description 304; and selection boxes 310 indicating whether the meeting is to be marked as "private" (e.g., so that it may only be viewed by the user) and whether the user should be notified of the meeting ahead of time (e.g., via an audio and/or graphical alarm). In addition, the calendar entry window 300 includes data fields which indicate a meeting type 306 (e.g., "teleconference") and a meting priority 308. As will be described in greater detail below, different default parameters may be used for different meeting types and/or priorities.

A contact parameter selection region 320 of calendar entry window 300 is comprised of a set of selectable parameters which define how the various PIM/messaging applications will operate when the user is in the meeting. The parameters are divided generally into a set of permitted contacts 340 and a set of permitted communication "channels" 350.

The set of permitted contacts 340 allows the user to define the individuals or groups of individuals who are permitted to contact the user while the user is in the meeting. In one embodiment, the list of individuals/groups from which the user may select are those defined in the user's electronic address book 208. The electronic address book may provide certain pre-selected groups to which contacts in the address book may be assigned such as, for example, a "business" contacts group and a "personal" contacts group. Most electronic address books also allow users to define their own group categories (e.g., "Information Systems Team," "All Partners" . . . etc). In one embodiment, the different contact categories are communicated from the user's electronic address book 208 to the user's electronic calendar 206 via interface 200. Accordingly, as soon as the user adds a new contact group, the addition will automatically be reflected in the calendar program 206 (e.g., the new group will automatically be selectable within the set of user-configurable parameters shown in FIG. 3).

Returning to the specific set of parameters illustrated in FIG. 3, two potential selections are "All" 321, which allows all individuals/groups to contact the user during the meeting, and "None" 322, which prevents any individual/group from contacting the user during the meeting. Two additional categories of individuals/groups included in the set of parameters are "All Personal" 323 and "All Business" 324. When selected, these two categories allow all of the user's personal contacts and/or all of the user's business contacts, respectively (e.g., as categorized in the user's electronic address book 208), to contact the user during the meeting. Thus, if the user is in an important meeting but still wants to keep in touch with family members, the user may select the "All Personal" option 323. Similarly, if the user is in the middle of an important business negotiation and is being supported by a team of individuals back at the office, the user may check the "All Business" option 324 to remain in contact with co-workers at the office.

In addition, in the embodiment illustrated in FIG. 3, the user may manually select individual contacts or groups of contacts via selection element 325. In one embodiment, a "contacts" button 341 is provided which, when selected by the user, generates a selection window such as that shown in FIG. 4, comprised of a list of all available contacts and/or groups of contacts 400. As mentioned above, in one embodiment, the list of available contacts 400 is maintained by the address book program 208 and provided to the calendar program 206 via the interface 200. The user may then manually navigate through the list 400 to add contacts and/or contact groups to the list of permitted contacts 408 (i.e., those individuals/groups which should permitted to contact the user during the meeting) via an "Add" button 402. As will be described in greater detail below, the user may also specify specific communication channels over which each selected individuals/groups may contact the user, as indicated by permitted channels list 410. A "Delete" button 406 may also be provided to delete contacts from the permitted contacts list 408 and an "Edit" button 404 may be provided to edit the permitted channels associated with each contact.

Referring again to FIG. 3, in addition to the set of permitted contacts 340, in one embodiment, a set of permitted communication "channels" 350 is provided within the calendar entry window 300. The set of selected channels indicates the manner in which the permitted contacts may contact the user. In the example illustrated in FIG. 3, the selectable channels include "All" 326 indicating that the permitted contacts 340 may contact the user in any available manner. Thus, if the data processing device 110 includes telephony capabilities, the user may receive calls during the meeting (i.e., from any of the contacts identified in the permitted contacts region 340). In addition, if the data processing device 110 is capable of receiving e-mail and/or instant messages, then during the meeting the user will receive any new e-mail and/or instant messages directed to the data processing device 110. Various additional communication "channels" may be supported by the device while still complying with the underlying principles of the invention (e.g., the device may be capable of receiving faxes and/or Web-based content).

Other, more specific communication channel selections may be provided including, for example, e-mail 327, instant messaging 328, and telephone 329 selections. The user may select any combination of these communication channels to indicate specifically how the user may be contacted during the meeting. For example, if the user does not want to receive telephone calls but wants to be accessible via e-mail and instant messaging, the user may mark the selection boxes next to e-mail 327 and instant messaging 328 but may leave the selection box for telephone 329 unselected.

In addition, in one embodiment, the user may select specific communication channels for specific contacts or groups of contacts via selection box 330. For example, after selecting selection box 330, the user may link specific contacts or groups of contacts to specific communication channels via a "channels" button 351 within the calendar entry window 300. In one embodiment, the channels button 351 brings up the window 410 illustrated in FIG. 4 in which, for each specified contact, the user may select a specific set of communication channels. In the illustrated example, the contact "Joe Britt" is selected in the permitted contacts list 408 and "All" is selected in the "Permitted Channels" list 410. In one embodiment, the initial default setting for each individual and group of contacts is "All" channels. This default setting may then be modified by the user as desired. Thus, even though the general communication channel setting shown in FIG. 3, is "Instant Messaging" (indicating that only instant messaging will be available for most contacts) the contact "Joe Britt" is permitted to contact the user via all available communication channels. The user may make similar specific communication channel selections for any of the permitted contacts or contact groups (e.g., such as "All Personal").

Additional settings for each selected communication channel may also be specified by the end user. For example, in the embodiments shown in FIGS. 3 and 4, two sets of "settings" buttons 355 and 455, respectively, are provided to allow the user to modify settings for each individual calendar entry and/or for each particular contact or group of contacts identified in the permitted contacts list 408, respectively. For example, for a particular calendar entry, the user may want to receive telephone calls but may not want the telephone to ring. Accordingly, for that particular meeting, the user may indicate that only the vibrate feature should be operable via the telephone settings button 355 shown in FIG. 3. Similarly, if the user is expecting an important call from one contact, the user may specify—for that contact only— that the telephone should ring, via the telephone settings button 455 shown in FIG. 4. The telephony interface 210 may identify the incoming caller using ANI technology or any similar caller identification technology. By way of another example, the user may want to receive instant messages during a meeting but may want to suppress the audio associated with the instant messages only for that meeting. The user may do so via the instant messaging settings button 355 shown in FIG. 3. In addition, the user may generate a meeting-specific automatic e-mail/instant message response or a contact-specific e-mail/instant message response via settings buttons 355 and 455, respectively. Various additional channel settings may be provided so that the user may precisely define how the data processing device 110 should operate during a meeting.

In one embodiment, the user may specify a set of default settings for each calendar entry type. For example, FIG. 5 illustrates a set of exemplary default settings for a "vacation" calendar entry. As illustrated, the user has selected "All Personal," indicating that any personal contacts should be permitted to contact the user, and "All," indication that any available communication channel may be used. In addition, the user has specified a default priority setting (3) and has indicated that the calendar entry should be a "private" entry. The user may specify default settings for various other calendar entry types. Moreover, in one embodiment, the user may create his/her own calendar entry types. Some exemplary types include "Holiday," "Projects," "Clients," "In-Person Meeting," "Travel," "Teleconference" . . . etc. The underlying principles of the invention are not limited to any particular calendar entry types.

In one embodiment, the user may specify a set of default settings for each calendar entry priority rather than (or in addition to) each calendar entry type. For example, for the highest priority meetings, the user may indicate that no contacts are permitted whereas for the lowest priority meetings All contacts are permitted. For intermediate priorities, the user may specify which contacts are permitted and which are not.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, the specific architecture and system configuration illustrated in FIG. 1 and described in the Network Portal Application is not required for implementing the underlying principles of the invention. Rather, the embodiments described herein may be implemented on virtually any type of data processing device including standard personal computers, personal digital assistants and wireless telephones.

Figure 4:
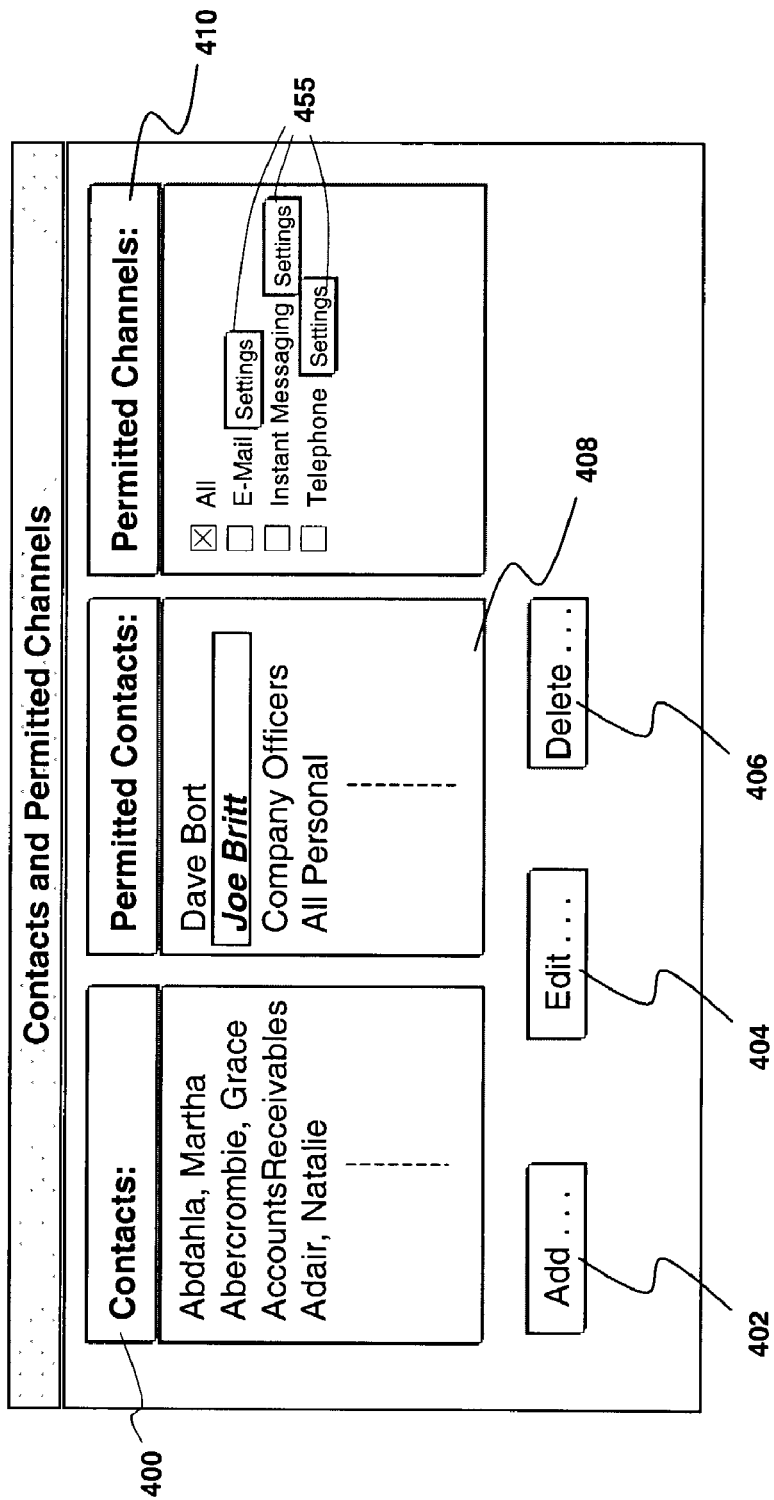
FIG. 4 illustrates permitted contacts and associated permitted communication channels according to one embodiment of the invention.

In addition, although the graphical user interface ("GUI") illustrated in FIGS. 3-5 included specific GUI elements (e.g., such as a series of check boxes for selecting contacts and channels), various alternate/additional graphical or non-graphical contact/channel selection techniques may be employed including drop-down selection windows and standard data entry fields.

Finally, although the interface 200 is illustrated in FIG. 2 as being executed on the data processing device 110, various interface functions may be employed directly on the service 100. For example, when the user chooses not to receive e-mail and/or instant messages for a particular meeting, the service 100 may temporarily store the e-mail and instant messages until the meeting is over (i.e., rather than transmitting the e-mail/instant messages to the device and wasting wireless bandwidth). Similarly, if the user chooses to generate an automatic response to e-mail messages and instant messages, the automatic response may be stored and transmitted directly from the service 100 without any additional processing required by the data processing device 110.

Accordingly, the scope and spirit of the invention should be judged in terms of the claims which follow.

What is claimed is:

1. A computer-implemented method comprising:
    scheduling an event in a user's electronic calendar;
    identifying a set of contacts or contact groups permitted to contact said user of a data processing device during said scheduled event in said electronic calendar, wherein said identifying a set of contacts or contact groups comprises searching through a list of all available contacts or contact groups provided by an electronic address book application executed on said data processing device;
    for each individual contact or contact group, indicating one or more permitted communication channels over which said user is willing to receive communication events during said scheduled meeting, the user having the option to select a different set of communication channels for each individual contact or contact group;
    receiving a communication event from a first contact over a first communication channel;
    comparing said first contact against said identified sets of permitted to contact said user;
    comparing the first communication channel with the permitted communication channels associated with said first contact; and
    notifying said user of said communication event during said scheduled event only if said first contact is in at least one of said sets of contacts or is included within at least one of said contact groups, and said first communication channel comprises one of said permitted communication channels associated with said contact or said contact group.

2. The method as in claim 1 wherein said identifying a set of contacts comprises searching through a list of all available contacts provided by an electronic address book application executed on said data processing device.

3. The method as in claim 1 wherein said first communication channel is an instant messaging channel and said communication event is an instant message.

4. The method as in claim 1 wherein said first communication channel is a telephone communication channel and said communication event is a telephone call.

5. The method as in claim 4 wherein said first contact is identified using automatic number identification ("ANI") caller identification techniques.

6. The method as in claim 1 wherein said first communication channel is an e-mail channel and said communication event is an instant message.

7. The method as in claim 1 wherein said contacts groups comprise a personal contacts group and a business contacts group.

8. The method as in claim 1 further comprising:
providing a graphical user interface ("GUI") allowing said user to select permitted contacts, the GUI allowing said user to select (a) all contacts in said address book, (b) no contacts in said address book or (c) specific contacts or groups from said address book as the contacts or contact groups permitted to contact said user during said scheduled event.

9. The method as in claim 8 wherein said GUI provides selectable options for permitted communication channels including all communication channels or specified communication channels.

10. An article of manufacture having program code stored thereon which, when executed by a machine, cause said machine to perform the operations of:
scheduling an event in an electronic calendar;
identifying a set of contacts or contact groups permitted to contact said user of a data processing device during said scheduled event in said electronic calendar, wherein said identifying a set of contacts or contact groups comprises searching through a list of all available contacts or contact groups provided by an electronic address book application executed on said data processing device;
for each individual contact or contact group, indicating one or more permitted communication channels over which said user is willing to receive communication events during said scheduled meeting, the user having the option to select a different set of communication channels for each individual contact or contact group;
receiving a communication event from a first contact over a first communication channel;
comparing said first contact against said identified sets of permitted to contact said user;
comparing the first communication channel with the permitted communication channels associated with said first contact; and
notifying said user of said communication event during said scheduled event only if said first contact is in at least one of said sets of contacts or is included within at least one of said contact groups, and said first communication channel comprises one of said permitted communication channels associated with said contact or said contact group.

11. The article of manufacture as in claim 10 wherein said first communication channel is an instant messaging channel and said communication event is an instant message.

12. The article of manufacture as in claim 10 wherein said first communication channel is a telephone communication channel and said communication event is a telephone call.

13. The article of manufacture as in claim 12 wherein said first contact is identified using automatic number identification ("ANI") caller identification techniques.

14. The article of manufacture as in claim 10 wherein said contacts groups comprise a personal contacts group and a business contacts group.

15. The article of manufacture as in claim 14 comprising additional program code to cause said machine to perform the operations of:
providing a graphical user interface ("GUI") allowing said user to select permitted contacts, the GUI allowing said user to select (a) all contacts in said address book, (b) no contacts in said address book or (c) specific contacts or groups from said address book as the contacts or contact groups permitted to contact said user during said scheduled event.

16. The article of manufacture as in claim 14 wherein said GUI provides selectable options for permitted communication channels including all communication channels or specified communication channels.

17. A method implemented in connection with a data processing device capable of communicating over a plurality of communication channels comprising:
scheduling an event in an electronic calendar;
associating a first set of communication channels in said plurality of communication channels with said scheduled event, said first set of communication channels for business contacts or business contact groups;
associating a second set of communication channels in said plurality of communication channels with said scheduled event, said second set of communication channels for personal contacts or personal contact groups; wherein associating the first or second set of communication channels indicates permitted communication channels over which said user is willing to
receive communication events during said scheduled event, the user having the option to select a different set of communication channels for each individual personal or business contact or contact group;
receiving a communication event over a first communication channel from one of said business contacts or business contact groups during said scheduled event;
comparing said first communication channel against said first set of communication channels;
processing said first communication event in a first specified manner if said first communication channel is in said first set of communication channels; and
processing said first communication event in a another specified manner if said first communication channel is not in said first set of communication channels.

18. The method as in claim 17 wherein said first communication event is a telephone call.

19. The method as in claim 17 wherein said first communication event is an e-mail message.

20. The method as in claim 17 wherein said first communication event is an instant message.

21. The method as in claim 17 wherein said first specified manner comprises generating a notification to a user that said first communication event has occurred.

22. The method as in claim 17 wherein said second specified manner comprises suppressing a notification to a user that said first communication event has occurred.

23. The method as in claim 17 wherein said first specified manner comprises generating a first type of notification and said second specified manner comprises generating a second type of notification.

24. The method as in claim 23 wherein said first communication channel is a telephone channel and wherein said first specified manner comprises an audible notification and said second specified manner comprises a non-audible notification.

* * * * *